United States Patent

Carpenter

[15] 3,705,520
[45] Dec. 12, 1972

[54] DEPRESSED PARK WINDSHIELD WIPER SYSTEM

[72] Inventor: Keith H. Carpenter, Kettering, Ohio
[73] Assignee: General Motors Corporation, Detroit, Mich.
[22] Filed: Oct. 21, 1971
[21] Appl. No.: 191,385

[52] U.S. Cl.................................74/600, 15/250.17
[51] Int. Cl..............................................B60s 1/24
[58] Field of Search..........74/600, 42, 75; 15/250.16, 15/250.17

[56] References Cited

UNITED STATES PATENTS 3,115,599   12/1963   Ziegler..............................74/600 X
3,242,520   3/1966    Carroll et al......................74/600 X Primary Examiner—Milton Kaufman
Assistant Examiner—F. D. Shoemaker
Attorney—W. E. Finken et al.

[57] ABSTRACT

In a preferred form, this disclosure relates to an actuating mechanism for oscillating a pair of windshield wipers across the windshield between inboard and outboard positions during running operation and for moving the wipers to a depressed park position when running operation is being terminated. The actuating mechanism comprises a housing means, an annular drive member rotatably supported by the housing means, a drive shaft rotatably supported by the housing means for rotation about its axis and drivingly connected with the drive member and a drive means operatively connected with the drive shaft for rotating the same. The actuating mechanism further comprises a crank assembly including a crank arm which is adapted to be connected with the wipers and a crank shaft eccentrically and rotatably supported by the drive member. The actuating mechanism additionally includes a shiftable means slidably supported on the drive shaft and the housing means and which is spring biased toward a first position in which it engages the crank assembly to lock the same against rotation relative to the drive shaft so that the crank assembly rotates with the drive member about the axis of the drive shaft during running operation of the wipers and which is shiftable by fluid pressure toward a second position in which it disengages the crank assembly and rotates the crank assembly in a direction opposite the direction of rotation of the drive shaft to increase the throw of the crank arm to move the wipers from their inboard position towards their park position.

3 Claims, 7 Drawing Figures

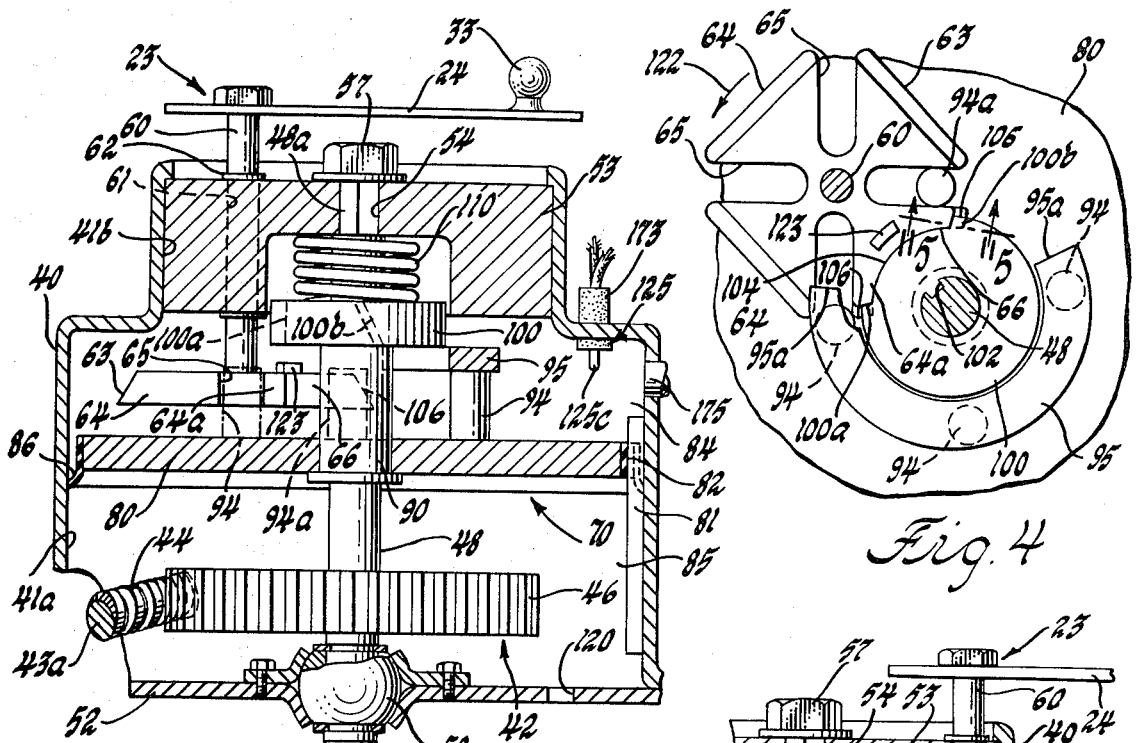
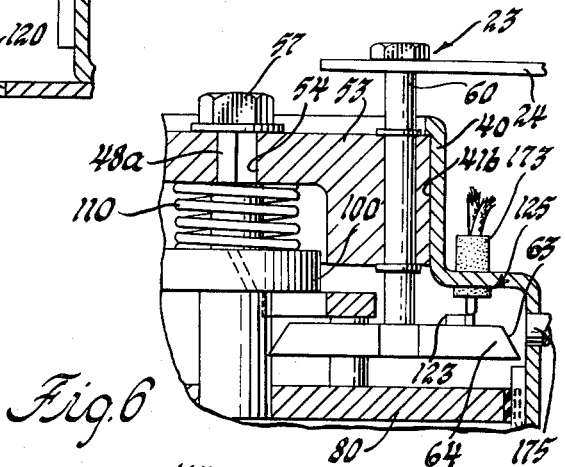
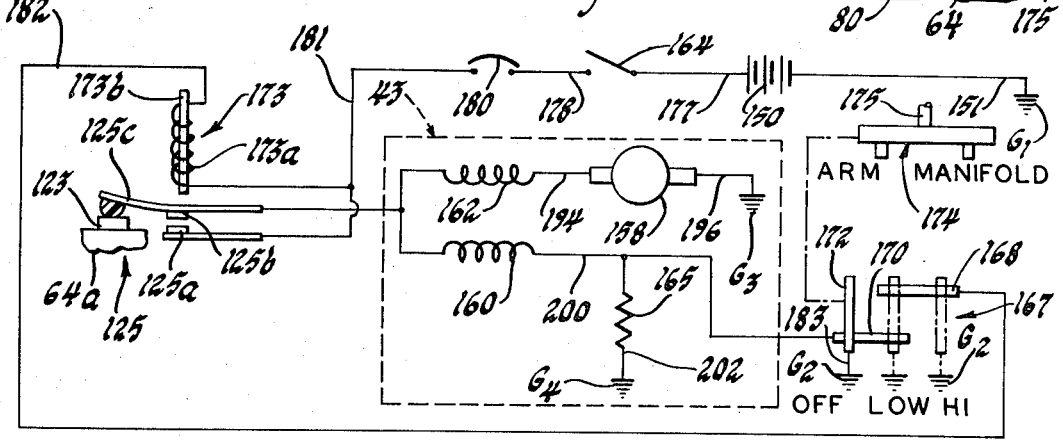

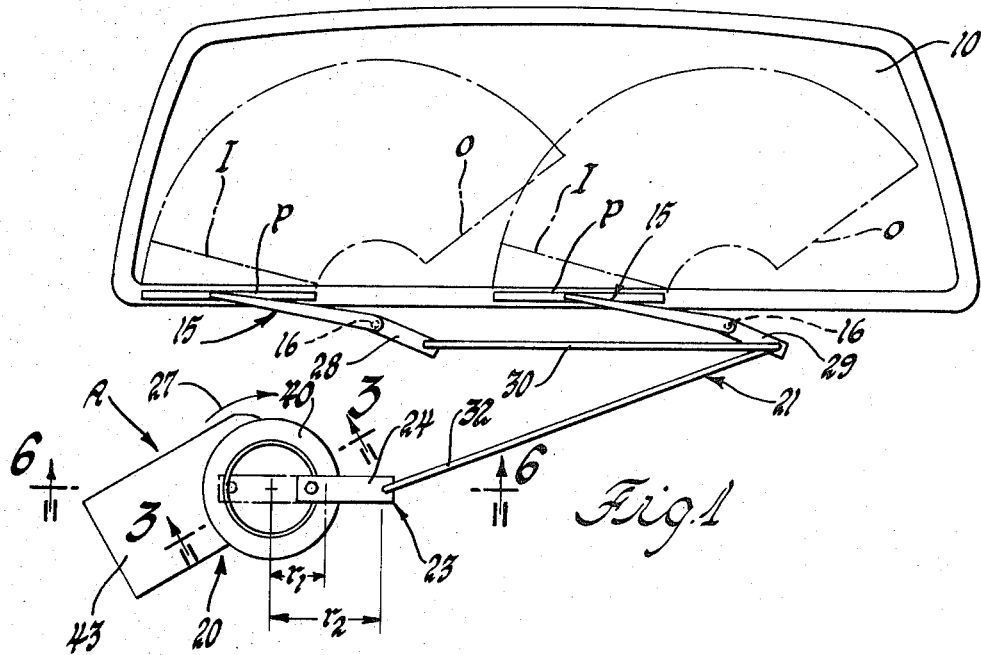
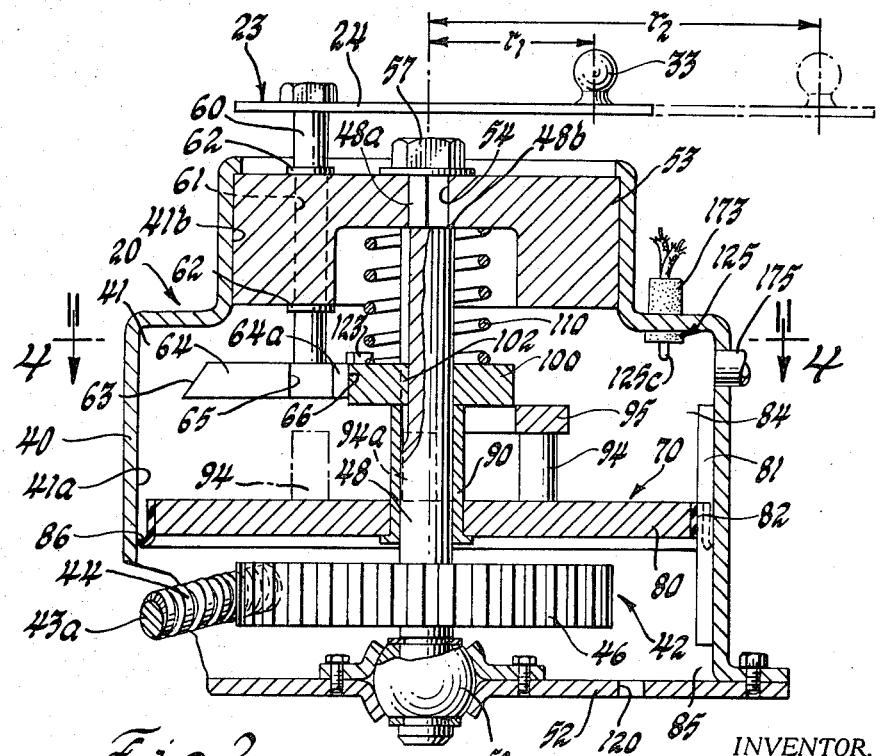

DEPRESSED PARK WINDSHIELD WIPER SYSTEM

The present invention relates to a windshield wiping system, and in particular to an actuating mechanism for oscillating windshield wipers across a windshield of an automotive vehicle between inboard and outboard positions during running operation and for moving the wipers to a depressed park position spaced from the inboard position when wiper operation is being terminated.

An object of the present invention is to provide a new and improved actuating mechanism for oscillating a windshield wiper across the outer surface of a windshield between inboard and outboard positions during running operation and for moving the wipers to a depressed park position spaced from the inboard position when wiper operation is being terminated and wherein the mechanism is of a relatively simple and economical construction.

Another object of the present invention is to provide a new and improved actuating mechanism for oscillating a windshield wiper across the windshield between inboard and outboard positions during running operation and for moving the wiper to the depressed park position spaced from the inboard position when wiper operation is being terminated and in which the mechanism includes a housing means, an annular drive member rotatably supported by the housing means, a drive shaft supported by the housing means for rotation about its axis and drivingly connected to the drive member, a crank assembly including a crank arm which is adapted to be connected with the wipers and a crank shaft which is eccentrically and rotatably supported by the drive member and a fluid operated shiftable means slidably supported by the drive shaft and the housing means and which is shiftable between a first position in which it engages the crank assembly to lock the same against rotation relative to the drive shaft so that the crank assembly rotates with the drive shaft about the axis of the latter during running operation of the wipers and a second position in which it effects rotation of the crank assembly in a direction opposite the direction of rotation of the drive shaft to increase the throw of the crank assembly and move the wiper to its park position upon their reaching their inboard position when wiper operation is being terminated.

Briefly, the above objects are accomplished by providing a novel actuating mechanism which, in the preferred and illustrated embodiment, comprises a housing means, an annular drive member rotatably supported by the housing means, a drive shaft supported by the housing means for rotation about its axis and drivingly connected with the drive member, a drive means operatively connected with the drive shaft for rotating the same and the drive member, a crank assembly including a crank arm which is adapted to be operatively connected with the wipers and a crank shaft eccentrically and rotatably supported by the drive member, and a shiftable means including a fluid operated piston which is slidable on the drive shaft and the housing means. The shiftable means, when no differential pressure is applied across the piston, is biased toward a first position in which a slidable element cooperably engages a geneva wheel drivingly connected to the crank shaft to effect rotation of the crank shaft assembly with the drive shaft about the axis of the latter during running operation of the wipers. When running operation of the wipers is being terminated a differential fluid pressure is applied across the piston to shift the shiftable means from its first position toward a second position in which it cooperably engages the geneva wheel to effect rotation of the crank shaft assembly in a direction opposite the direction of rotation of the drive member to cause the throw of the crank to be increased to move the wipers upon reaching their inboard position from their inboard position toward their park position.

The present invention further resides in various novel constructions and arrangement of parts, and further objects, novel characteristics and advantages of the present invention will be apparent to those skilled in the art to which it relates and from the following detailed description of the illustrated embodiments thereof made with reference to the accompanying drawings forming a part of this specification and in which similar reference numerals or characters are employed to designate corresponding parts throughout the several views, and in which:

FIG. 1 is a schematic view of a windshield wiper system embodying the novel actuating mechanism of the present invention;

FIG. 2 is an axial cross-sectional view, with portions shown in elevation, of the preferred embodiment of the actuating mechanism of the present invention;

FIG. 3 is a view like that shown in FIG. 2, but showing different parts thereof in different positions;

FIG. 4 is a fragmentary sectional view taken approximately along line 4—4 of FIG. 2;

FIG. 5 is an enlarged fragmentary sectional view taken approximately along line 5—5 of FIG. 4;

FIG. 6 is a fragmentary sectional view like that shown in FIG. 3, but showing different parts thereof in different positions;

FIG. 7 is a schematic view of a control circuit means for controlling operation of the actuating mechanism of the present invention.

The present invention provides a novel actuating mechanism for use in a windshield wiping system for oscillating a pair of windshield wipers across the outer surface of a windshield between inboard and outboard positions during running operation and to a depressed park position spaced from the inboard position when wiper operation is being terminated.

As representing a preferred embodiment of the present invention, FIG. 1 of the drawings schematically shows a windshield wiping system A for wiping a windshield 10 of an automotive vehicle (not shown). The windshield wiping system A comprises a pair of suitable or conventional windshield wipers 15 which are drivingly connected to drive pivots 16. The drive pivots are adapted to be rotatably supported by the body structure of the vehicle (not shown) at spaced locations adjacent the lower edge of the windshield 10.

The wipers 15 are adapted to be oscillated in tandem across the outer surface of the windshield 10 between inboard and outboard positions, designated by the letters I and O in FIG. 1 of the drawing, during running operation and are adapted to be moved from their inboard position I to a depressed park position P adjacent the lower edge of the windshield 10 when running operation is being terminated.

The wipers 15 are actuated or oscillated between their inboard and outboard positions and to their park position P by a novel actuating mechanism 20 via a transmission linkage means 21. The novel actuating mechanism 20 includes a rotatable crank assembly 23 having a crank arm 24 which is rotated in the direction of the arrow 27. The transmission linkage 21 comprises a pair of crank arms 28 and 29 having one end fixed to the drive pivots 16 and the other end swivelly connected to a cross link 30. The transmission linkage also includes a drive link 32 which is swivelly connected to the crank arm 24 at one end and the other end is swivelly connected to a ball 33 carried by one end of the crank arm 24 (see FIG. 2). Rotation of the crank arm 24 in the direction of the arrow 27 causes the transmission linkage 21 to be reciprocated to cause the wipers to be oscillated in tandem across the outer surface of the windshield 10.

The crank arm 24 has an effective radius $r_1$ during running operation which causes the wipers to be oscillated between their inboard and outboard positions I and O. When wiper operation is being terminated and the wipers 15 reach their inboard position the throw or radius of the crank arm is increased to $r_2$ to cause the wipers 15 to be moved to their depressed park position P.

The novel actuating mechanism 20 further comprises a metal casting or housing 40 having an opening 41 therein. The opening 41 has a first diameter portion 41a and a reduced diameter portion 41b adjacent its upper end, as viewed in FIG. 2.

The housing means 40 supports a drive assembly 42. The drive assembly 42 comprises a unidirectional DC electric motor 43 whose output or armature shaft 43a is fixed to a worm 44. The worm 44 is in meshed engagement with a worm gear 46 fixed to a drive shaft 48. As viewed in FIG. 2, the drive shaft is rotatably supported adjacent its lower ends via a bearing 50 carried by an end cap or plate 52 suitably secured to the housing 40 at its lower end. The drive shaft 48 is also drivingly connected at its upper end to an annular drive member or bearing cap 53 rotatably supported by the housing 40 at its upper end. The drive shaft 48 includes a non-circular portion 48a which is received in the complementary shaped opening 54 in the drive member 53 to provide a driving connection therebetween. The annular drive member 53 is held in abutting engagement with a shoulder 48b on the drive shaft 48 by a suitable nut 57. The drive shaft 48 and the annular drive member 53 are concentric and when the electric motor 43 is energized the drive shaft 48 and annular drive member 53 are rotated within the housing 40 about the longitudinal axis of the drive shaft 48.

The crank assembly 23 is rotatably and eccentrically supported by the annular drive member 53. The crank assembly 23 comprises the crank arm 24 which has one end thereof secured to a crank shaft 60, the crank shaft 60 being rotatably received within an eccentric opening 61 in the drive member 53 and held against relative axial movement with respect to the drive member 53 by a pair of retainer rings 62. The longitudinal axis of the crank shaft 60 is spaced from, but extends parallel to the longitudinal axis of the drive shaft 48. The crank assembly 23 further includes a geneva wheel 63 which is drivingly connected to or fixed on the lower end of the crank shaft 60. The geneva wheel 63 comprises a plurality of angularly spaced lobes 64 and slots or recesses 65. The recesses 65 extend radially of the wheel and one of the lobes 64a has a radially extending, arcuately shaped recess or cut out 66 at its outer edge or periphery, and for reasons to be noted hereinafter.

The crank assembly 23 is adapted to be drivingly connected with the drive assembly 42 by a shiftable means 70. The shiftable means 70 comprises a piston 80 which is slidably supported by the housing 40 along the opening portion 41a for linear movement toward and from the annular drive member 53, but which is prevented from rotating relative to the housing. To this end, the housing 40 includes an axially extending rib 81 which is received within a notch 82 in the periphery of the piston 80 to prevent the same from rotating relative to the housing 40. Alternately, the piston 80 and the housing 40 could be of a non-circular shape in order to prevent the piston 80 from rotating relative to the housing 40. The piston 80 divides the housing 40 into upper and lower chambers 84 and 85.

The piston 80 includes an annular seal 86 at its periphery for sealingly engaging the inner wall of the housing 40. The piston 80 carries a shift tube 90 which is slidably supported on the drive shaft 48. The piston 80 also has a plurality, four in the preferred embodiment, axially extending posts 94 which are equally angularly spaced and which are equally radially spaced from the axis of the drive shaft 48. A partial or C-shaped flat ring member 95 is secured to three of the posts 94 at their ends remote from the piston and with the fourth post 94a being equally spaced between the adjacent ends 95a of the C-shaped ring member 95.

The shiftable means 70 further includes a collar 100 which is slidably supported by the drive shaft 48 for relative movement axially therealong, but which is prevented from rotating relative thereto. To this end, the collar 100 is drivingly connected to the drive shaft 48 via a key and slot connection 102 which prevents relative rotation between the collar 100 and shaft 48, but allows the collar 100 to slide axially therealong.

The shiftable means 70 is normally biased toward the position shown in FIG. 2, which is also the position of the parts during running operation of the wipers 15. The shiftable means 70 is biased to the position shown in FIG. 2 by a compression spring 110 having one end in abutting engagement with the bottom of the annular drive member 53 and its other end in abutting engagement with the collar 100. The spring 110 biases the collar 100 downwardly which in turn engages the shift tube 90 to bias the same and the piston 80 to the position shown in FIG. 2. In this position, the collar 100 drivingly engages the lobe 64a of the geneva wheel 63. To this end, the collar 100 has an arcuately and radially extending recess or notch 104 adjacent a peripheral portion thereof which is complementary in shape to the adjacent portion of the lobe 64a of the geneva wheel 63. The lobe 64a of the geneva wheel at its opposite ends 106 is tapered and the collar 100 at its ends 100a and 100b which engage the ends 106 of the lobe 64a of the geneva wheel 63 are complementarily tapered so that the collar 100 is in wedged engagement with the ends 106 of the geneva wheel 63 to drivingly connect the geneva wheel 63 to the collar 100. When in this position, the drive shaft 48 also functions, through the collar 100, to prevent rotation of the crank shaft 60 relative to the annular drive member 53 whereby the crank arm 24 is caused to be rotated with the annular drive member 53 about the axis of the drive shaft 48. When the crank arm is rotated about the axis of the drive shaft 48, the wipers are caused to be moved between their inboard and outboard positions I and O, respectively.

The shiftable means 70 is adapted to be moved upwardly from its position shown in FIG. 2 towards its position shown in FIG. 3 when wiper operation is being terminated. This upward movement of the shiftable means 70 toward the position shown in FIG. 3 is effected by communicating the chamber 84 with a vacuum source, such as the inlet manifold of the vehicle. The lower chamber 85 is vented at all times to the atmosphere via port 120. When vacuum pressure is applied to the chamber 84 the piston 80 is caused to be moved upwardly in opposition to the biasing force of the spring 110.

If the wipers 15 are not in their inboard position I when wiper operation is being terminated the C-shaped ring 95 will engage the underside of the geneva wheel 63 as the crank assembly 23 and annular drive member 53 continue to rotate. This engagement continues until the geneva wheel 63 moves clear of the C-shaped ring 95, which occurs when the wipers 15 are in their inboard position I. When the geneva wheel 63 is disengaged from the ring 95, the piston 80, ring 95 and collar 100 are moved upwardly via the shift tube 90. As the collar 100 moves upwardly it disengages the lobe 64a of the geneva wheel 63. However, prior to disengaging the lobe 64a of the geneva wheel 63 the post 94a on the piston will be received within slot 65 adjacent the upper side of the lobe 64a of the geneva wheel 63, as viewed in FIG. 4. When the collar 100 disengages the geneva wheel 63 the crank assembly 23 is free to rotate relative to the drive member 53 and continued rotation of the drive member 53 and crank assembly 23 in the direction of the arrow 27 causes the geneva wheel 63 to be rotated therewith and also in the opposite direction, as indicated by the arrow 122. The geneva wheel 63 is caused to be also rotated in the opposite direction due to the engagement with the stationary post 94a which causes the geneva wheel 63 and crank assembly 23 to be rotated in the direction of the arrow 122. The geneva wheel 63 sequentially engages the posts 94 as it is rotated by the drive member 53. When the drive member 53 and the geneva wheel 63 have been rotated 180°, after the wipers 15 reach their inboard position I, a cam 123, on the lobe 64a of the geneva wheel 63 will engage a park switch 125 to open the same and deenergize the wiper motor 43. The park switch 125 is carried by the housing 40.

During the relative rotation of the crank assembly 23 with respect to the drive assembly 42 the throw of the crank arm 24 or effective radius thereof is increased, as indicated by $r_2$. This increase in the throw of the crank arm 24 causes the crank arm 24 to move the wipers 15 from their inboard position I toward their depressed park position P via the transmission linkage 21.

Operation of the windshield cleaning system A will be described with reference to the schematic control circuit means or diagram shown in FIG. 6. The control circuit means includes a DC battery 150 having one terminal connected via a wire or conductor 151 to ground $G_1$, the park switch 125 for the wiper motor 43, the electric wiper motor 43 which includes an armature 158 and shunt and series field windings 160 and 162, respectively, an ignition switch 164, a resistor 165, a manually operable wiper switch 167 having stationary terminals 168 and 170 and a movable bridging member 172, a park switch relay 173 carried by the housing 40 and a valve means 174 for selectively communicating the chamber 84 with either the atmosphere or the inlet manifold.

The wiper switch 167 could be of any suitable or conventional construction and the movable bridging member thereof is movable between an off position, a low speed position and a high speed position. The park switch 125 includes a stationary contact 125a and a mobile contact 125b carried by a leaf spring 125c which is self-biased toward a closed position in which the contacts 125a and 125b engage each other, but which is normally held in an open position by the cam 123 on the geneva wheel 63 when the windshield wipers 15 are in their parked position P.

When the operator of the vehicle desires low speed operation of the windshield wiping system, he will move the bridging member 172 of the wiper switch from its off position to its low speed position, as shown by the dotted lines in FIG. 6. Movement of the bridging member 172 to its low speed position also causes the valve means 174 to be moved (the valve actuator, not shown, is operatively connected with the bridging member 172) to its open position in which it communicates the atmosphere with the chamber 84 via conduit 175 with the chamber 84 in communication with the atmosphere the spring 110 biases the shiftable means 70 towards its first position, as shown in FIG. 2. However, since the geneva wheel 63 is in engagement with a post 94 connected to the C-ring 95 and is located beneath the C-ring 95, the shiftable means 70 will remain in the position shown in FIG. 3 until it is located between the spaced ends of the C-ring 95.

When the bridging member is in the low speed position, an electric circuit is completed for energizing the park switch relay 173. This circuit is from battery 150, wire 177, now closed ignition switch 164, wire 178, circuit breaker 180, wire 181, relay coil 173a, wire 182, stationary contact 168, bridging member 172, wire 183 to ground $G_2$. Energization of the park switch relay 173 causes the core 173b thereof to move the leaf spring 125c and its associated contact 125b into engagement with the stationary terminal 125a to close the park switch 125. The closing of park switch 125 completes circuits for energizing the series and shunt field windings 162 and 160 and armature of the wiper motor 43. These circuits are from battery 150, wire 177, now closed ignition switch 164, wire 178, circuit breaker 180, wire 181, park switch 125, wire 185, series field winding 162, wire 194, motor armature 158, wire 196 to ground $G_3$, and from wire 185, shunt field windings 160, wire 200, stationary contact 170, bridging member 172, wire 183 to ground $G_2$. In the low speed position the shunt field windings 160 are fully energized. The completion of these circuits energizes the wiper motor 43 for low speed operation.

When the wiper motor is energized, it rotates the drive shaft 48 and the drive member 53 in the direction of the arrow 27. Rotation of the drive member 53 in this direction causes the crank assembly 23 to be also rotated in this direction, but the geneva wheel 63 will rotate the crank arm 24 in the opposite direction due to its sequential engagement with the posts 94. This opposite rotation of the geneva wheel occurs for the first 180° rotation of the annular drive member 53 and causes the throw of the crank arm 24 to be reduced and the wipers 15 to be moved from their park position P toward their inboard position I. When the annular drive member 53 has been rotated 180° the geneva wheel 63 will be positioned between the ends of the partial C-ring 95 and thus the biasing force of the spring 110 will move the collar 100 and the piston 80 downwardly from the position shown in FIG. 3 to the position shown in FIG. 2. As the collar 100 is moved downwardly it will engage the tapered ends 106 of the lobe 64a of the geneva wheel 63 to lock the geneva wheel 63 against rotation relative to the annular drive member 53 whereupon further rotation of the drive shaft 48 causes the drive member 53 and crank assembly 23 to be rotated together and about the axis of the drive shaft 48 whereby the wipers are oscillated between their inboard and outboard positions I and O, respectively.

When the wiper switch bridging member 172 is moved from its low speed position to its off position to terminate wiper operation, the aforedescribed circuit for the park switch relay 173 is broken, since the bridging member 172 disengages the stationary contact 168 in its off position. The wiper motor 43, however, remains energized until the wipers reach their park position since the park switch 125 is self-biased toward a closed position during running operation of the wipers 15 and since the cam 123 is disengaged therefrom, as shown in FIG. 3. The park switch 125 remains closed until the windshield wiper motor 43 moves the wipers to their park position at which time the cam 123 on the geneva wheel will open the same to de-energize the circuits to de-energize the wiper motor 43. Also, when the bridging member 172 is moved to its off position, the valve member 174 is moved to its second position in which it communicates the inlet manifold with the chamber 84. When this occurs the shiftable means is shifted from its position shown in FIG. 2 toward its position shown in FIG. 3. If the windshield wipers were not approximately in their inboard position I when the bridging member 172 is moved to its off position and the valve member 174 is moved to communicate the inlet manifold with the chamber 84, the shiftable means 70 is prevented from being moved towards its upper position, as shown in FIG. 3 due to the fact that the partial C-ring 95 will engage the underside of the geneva wheel 63. Thus, the annular drive member 53 and crank assembly 23 remain locked together until the geneva wheel 63 clears the partial C-ring 95, as shown in FIG. 2, at which time the wipers 15 will be at their inboard position. When this occurs, the shiftable means 70 is shifted upwardly to disengage the collar 100 from the geneva wheel 63 and to move a post 94a on the piston 80 within the slot 65 in the geneva wheel 63. The continued rotation of the annular member 53 causes the crank shaft assembly 23 to continue its rotation. However, the geneva wheel 63 due to its engagement with the post 94a is caused to be rotated in the opposite direction in the direction of the arrow 122. This increases the throw of the crank to radius $r_2$ and causes the wipers 15 to be moved from their inboard position I towards their park position P. When the crank assembly has been rotated 180°, the cam 123 on the geneva wheel will engage the leaf spring 125c of the park switch 125 to separate the contacts 125a and 125b to break the aforedescribed circuits and de-energize the wiper motor 43.

When the operator desires high speed operation, he will move the bridging member 172 of the wiper switch 167 to its high speed position, as indicated by the phantom lines in FIG. 6. Movement of the bridging member 172 to this position causes only the stationary contact 168 of the wiper switch 167 to be bridged. When in this position the hereinbefore described circuits for energizing the park switch relay 173 and the series field windings 162 and armature 158 of the wiper motor 43 are completed. The hereinbefore described circuit for energizing the shunt field windings 160 to ground $G_2$ is not completed, since the bridging member 172 does not bridge the contact 170 in the high speed position. When the bridging member 172 is moved to the high speed position, the shunt field windings 162 are energized via a circuit through resistor 165 to ground $G_4$ whereby the shunt field windings are only partially energized which causes the wiper motor 43 to operate at high speed, and in a manner well known to those skilled in the art. This latter circuit is from battery 150, wire 177, now closed ignition switch 164, wire 178, circuit breaker 180, wire 181, park switch 125 (which is closed when relay 173 is energized), shunt field windings 162, wire 200, resistor 165, wire 202 to ground $G_4$.

The manner in which the actuating mechanism 20 effects movement of the wipers 15 to their park position P when wiper operation is being terminated and from their park position to their inboard position I when wiper operation is being initiated is the same for high speed operation as it is for low speed operation.

Although the illustrated embodiment thereof has been described in great detail, it should be apparent that certain modifications, changes, and adaptations may be made in the illustrated embodiment, and that it is intended to cover all such modifications, changes and adaptations which come within the spirit of the present invention.

What is claimed is:

1. An actuating mechanism for use in oscillating a windshield wiper across the windshield between inboard and outboard positions during running operation and for moving the wiper to a park position spaced from the inboard position when wiper operation is being terminated comprising: a housing means; an annular drive member rotatably supported by said housing means; a drive shaft supported by said housing means for rotation about its axis and drivingly connected to said drive member; a drive means operatively connected with said drive shaft for rotating the same and said drive member; a crank assembly including a crank arm which is adapted to be operatively connected with the wiper and a crank shaft eccentrically and rotatably supported by said drive member; shiftable means including a piston slidable on said drive shaft and slidably supported by said housing means, said shiftable means being movable between a first position in which it engages said crank assembly to lock the same against rotation relative to said drive shaft so that the crank assembly rotates with the drive shaft about the axis of the latter and a second position in which it effects rotation of the crank assembly relative to the drive shaft to increase the throw of the crank assembly in response to continued rotation of said drive member; and means including means for creating a differential fluid pressure across the piston for holding the shiftable means in its first position during running operation and for moving the shiftable means to its second position when wiper operation is being terminated and the wipers are in their inboard position to increase the throw of the crank arm and thereby move the wipers to their park position.

2. An actuating mechanism for use in oscillating a pair of windshield wipers across a windshield between inboard and outboard positions during running operation and for moving the wipers to a depressed park position spaced from the inboard position when wiper operation is being terminated comprising: a housing means; an annular drive member rotatably supported by said housing means; a drive shaft supported by said housing means for rotation about its axis and drivingly connected with said drive member; drive means operatively connected with said drive shaft for rotating the same and said drive member; a crank assembly including a crank arm which is adapted to be connected with said wipers and crank shaft eccentrically and rotatably supported by said drive member; shiftable means including piston means slidable on said drive shaft and slidably supported by said housing means and an element slidable on said drive shaft, biasing means for biasing said element into engagement with said piston and said element and piston towards a first position in which said element engages a second element connected to said crank shaft to lock the drive and crank shafts against rotation relative to each other and to rotate said crank assembly about the axis of the drive shaft; control means including means for creating a differential fluid pressure across the piston to move said shiftable means from its first position towards a second position in which the first and second elements are disengaged from each other and in which means carried by the piston is cooperably engageable with means on the second element to effect rotation of the crank shaft in a direction opposite the direction of rotation of the annular member while the annular member continues to rotate through a predetermined angular extent to effect an increase in the throw of the crank arm, said control means being operable to allow said biasing means to move said shiftable means to its first position during running operation of the wiper and being operable to move said shiftable means towards its second position upon wiper operation being terminated and the wiper reaching its inboard position to effect an increase in the throw of the crank arm to move the wipers to their park position prior to de-energizing the drive means.

3. An actuating mechanism for use in oscillating a pair of windshield wipers across a windshield between inboard and outboard positions during running operation and for moving the wiper to a depressed park position spaced from the inboard position when wiper operation is being terminated comprising: a housing means; an annular drive member rotatably supported by said housing means; a drive shaft supported by said housing means for rotation about its axis and drivingly connected with said drive member; a drive means operatively connected with said drive shaft for rotating the same and said drive member; a crank assembly including a crank arm which is adapted to be operatively connected with said wipers and which is eccentrically and rotatably supported by said drive member; a piston slidable on said drive shaft and slidably supported by said housing; said piston having a plurality of axially extending posts at equally spaced angular locations on its side facing said annular drive member, a partial ring member secured to all but one of said posts at its end remote from the piston and with the adjacent ends of the partial ring defining a gap, a member which is both drivingly connected with said drive shaft and slidably supported thereon for linear movement therealong, a spring means having one end in abutting engagement with said annular drive member and its other end in abutting engagement with said element, said crank shaft being drivingly connected to a geneva wheel having alternately spaced lobes and recesses and with one of the lobes having a recessed periphery which is adapted to mate with a recessed peripheral portion of said element, said piston on its side remote from said drive member being vented to the atmosphere and on its opposite side being in communication with a vacuum source, said spring means biasing said piston and element toward a first position when no differential pressure exists across the piston and in which the recessed lobe of said geneva wheel is received within the recessed peripheral portion of said element to drivingly connect said geneva wheel with said element to effect rotation of said crank shaft with said drive shaft about the axis of the drive shaft, said piston and element being shiftable from their first position toward a second position in opposition to the biasing force of the spring when a differential pressure is applied across the piston and in which the element disengages itself from the geneva wheel and the post not connected to said ring engages one of the slots in the geneva wheel when wiper operation is being terminated, said partial ring being engageable with one side of said geneva wheel to prevent movement of said piston and element toward their second position until the wipers are in their inboard position at which time the geneva wheel will be disengaged from the ring to enable the piston and element to be moved towards their second position and at which time the post not connected to the ring will engage the slot of the geneva wheel to begin effecting rotation of the geneva wheel, which in turn will rotate the crank arm in the direction opposite the direction of the rotation of the drive member to increase the throw of the crank and move the wipers from their inboard position to their park position.

* * * * *